(No Model.) 3 Sheets—Sheet 1.
W. H. VON MENGERINGHAUSEN.
SPEED GOVERNOR.
No. 514,602. Patented Feb. 13, 1894.
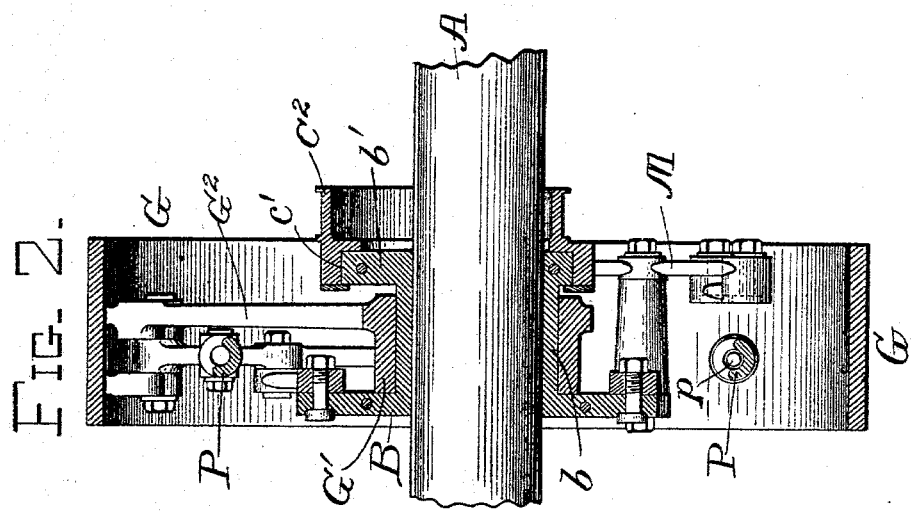
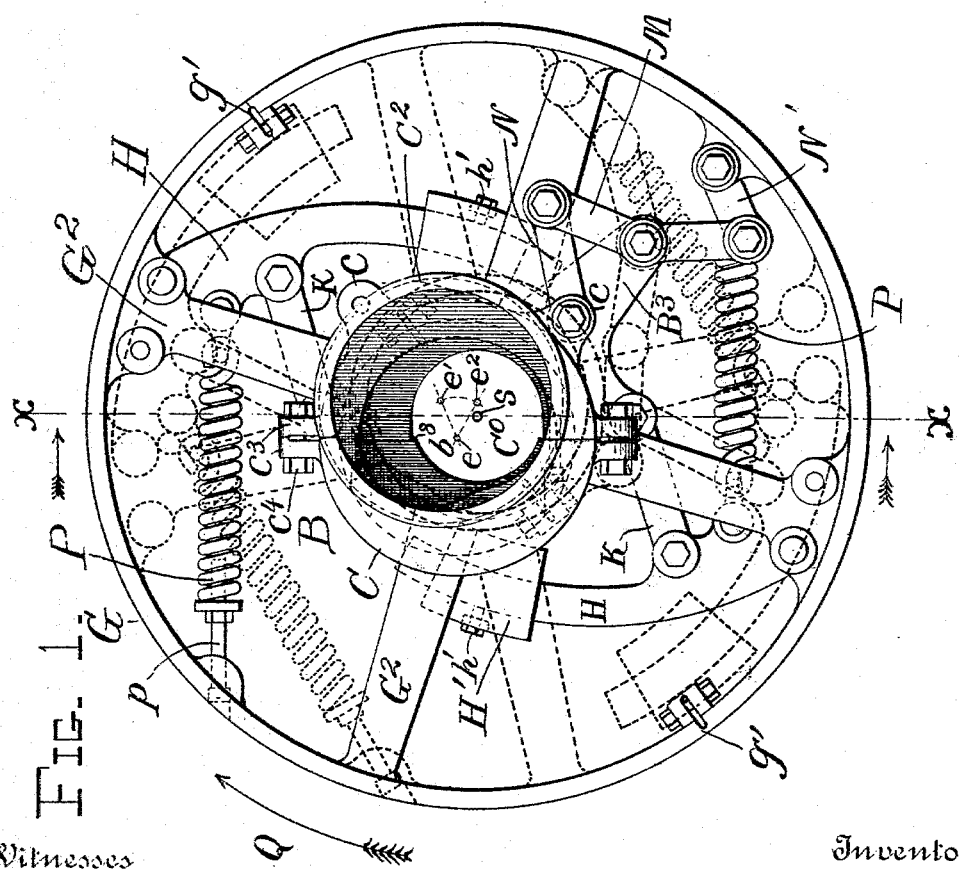
Witnesses
Percy C. Bowen
John C. Wilson
Inventor
W. H. von Mengeringhausen
By Whitman & Wilkinson
Attorneys
THE NATIONAL LITHOGRAPHING COMPANY,
WASHINGTON, D. C.

(No Model.) 3 Sheets—Sheet 2.
W. H. VON MENGERINGHAUSEN.
SPEED GOVERNOR.
No. 514,602. Patented Feb. 13, 1894.
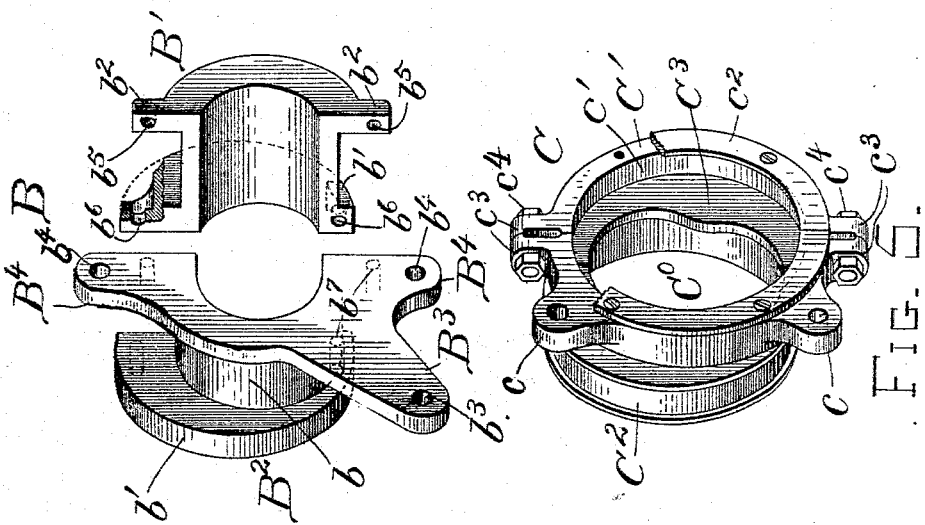
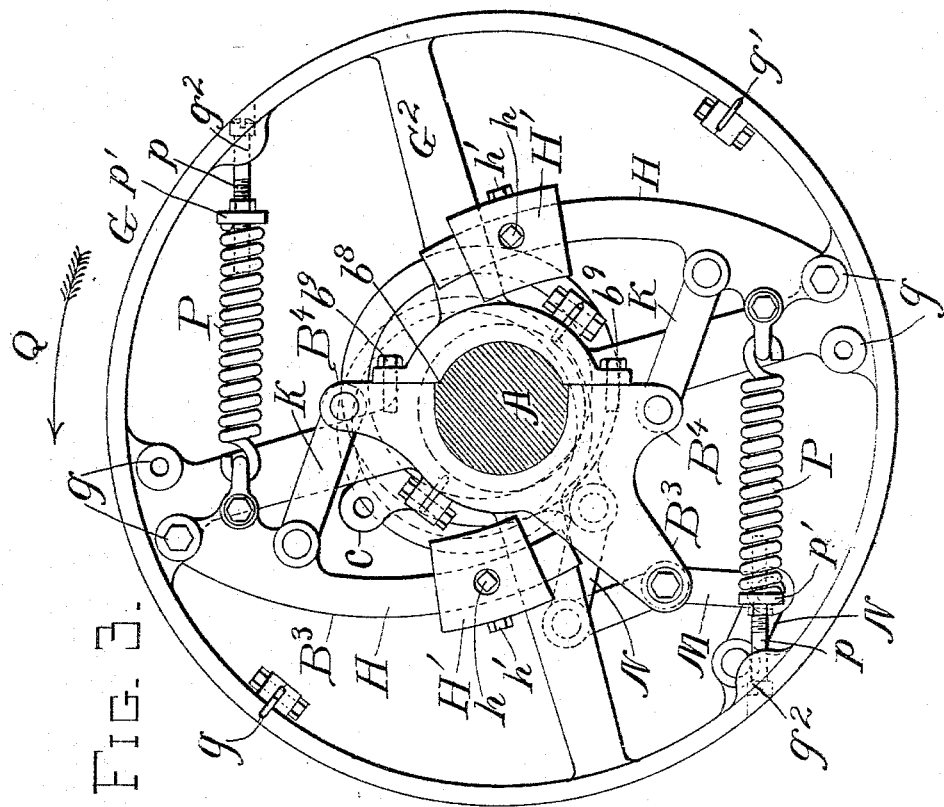

(No Model.) 3 Sheets—Sheet 3.
W. H. VON MENGERINGHAUSEN.
SPEED GOVERNOR.
No. 514,602. Patented Feb. 13, 1894.
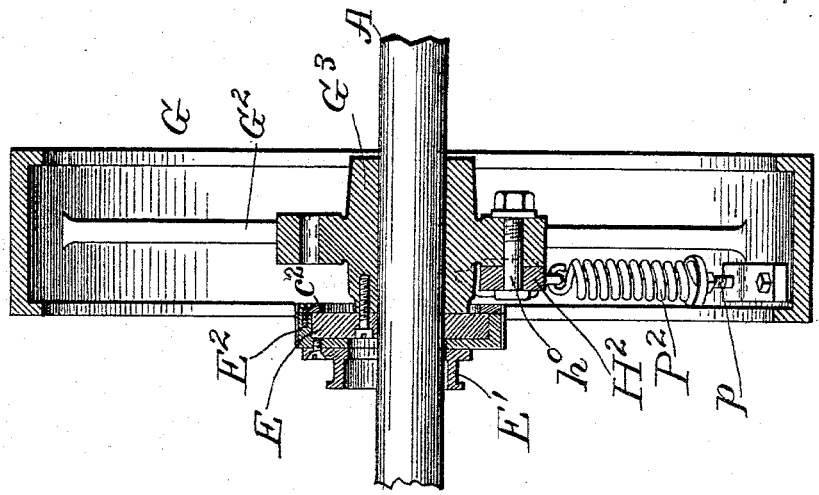
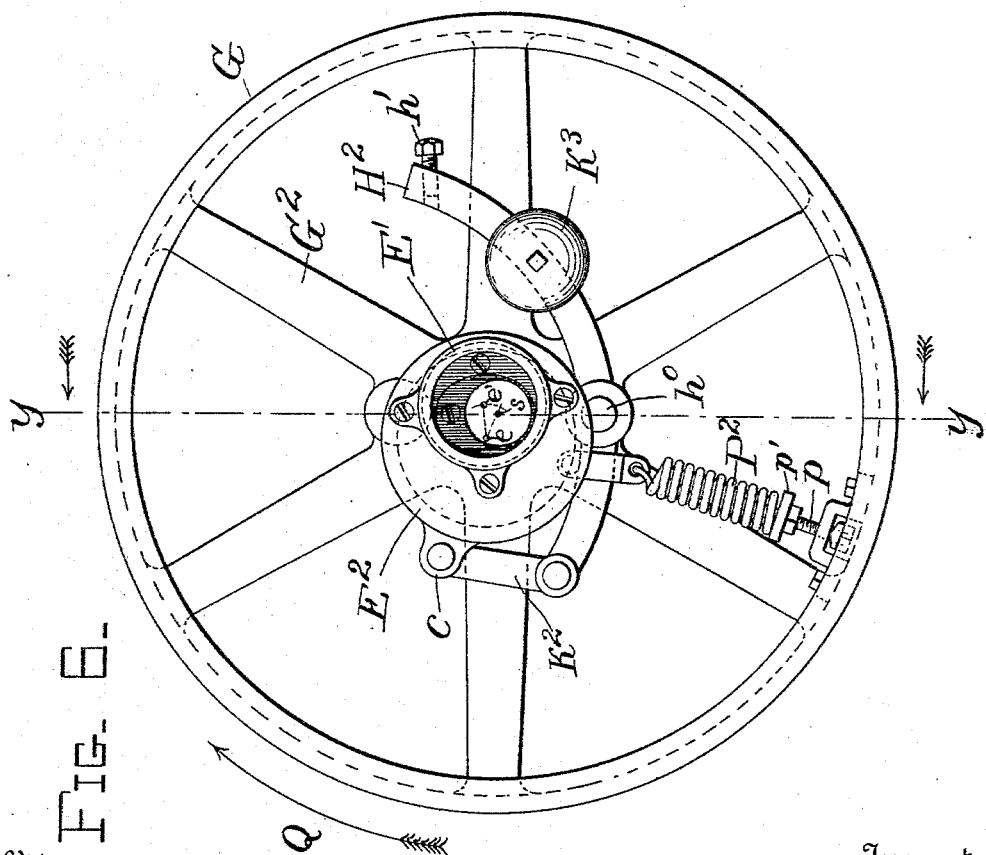
Witnesses
Percy C. Bowen.
John C. Wilson.
Inventor
W. H. von Mengeringhausen,
By Whitman & Wilkinson,
Attorneys.

UNITED STATES PATENT OFFICE.

WILLIAM H. VON MENGERINGHAUSEN, OF YORK, PENNSYLVANIA.

SPEED-GOVERNOR.

SPECIFICATION forming part of Letters Patent No. 514,602, dated February 13, 1894.

Application filed May 27, 1893. Serial No. 475,712. (No model.)

*To all whom it may concern:*

Be it known that I, WILLIAM H. VON MENGERINGHAUSEN, a citizen of the United States, residing at York, in the county of York and State of Pennsylvania, have invented certain new and useful Improvements in Speed-Governors; and I do hereby declare the following to be a full, clear, and exact description of the invention, such as will enable others skilled in the art to which it appertains to make and use the same.

My invention relates to improvements in speed governors, of that class whereby the travel of the valve is increased or decreased by shifting eccentrics mounted upon the main shaft or upon some other shaft moving synchronously with the said shaft; and it consists of certain novel features hereinafter described and claimed.

It consists especially of improvements upon my prior application, Serial No. 446,710, filed September 23, 1892.

Reference is had to the accompanying drawings, in which similar letters refer to corresponding parts throughout the several views.

Figure 1 represents a side elevation of the shifting eccentrics, and mechanism for operating the same mounted on the shaft, the shaft itself being omitted. Fig. 2 represents a section of the device shown in Fig. 1, along the line $x\ x$, the shaft being left in elevation, and the view being taken from the left, as indicated by the arrows. Fig. 3 represents a similar view to that shown in Fig. 1, except that it is seen from the opposite side of the governor, and the shaft is shown in section. Fig. 4 represents a perspective view of the two separable parts of the fixed eccentric, and illustrates the method of mounting the same on the shaft. Fig. 5 represents a perspective view of the shifting eccentric. Fig. 6 represents a side elevation similar to Fig. 1, and Fig. 7 represents a section similar to Fig. 2 of a modified form of the device.

In the device shown in Figs. 1 to 5, A represents the shaft, which carries the fixed hub B, preferably made in two parts B' and $B^2$ so as to be readily put in position on the shaft. The central portion of the said hub is cylindrical as shown at $b$, and on this cylindrical portion the flywheel is loosely mounted. The hub B is provided with an eccentric $b'$, with an arm $B^3$ having a bolt hole $b^3$ in the prolongation of the line through the centers of the shaft A and of the eccentric $b'$; and the hub is also provided with two arms $B^4$ on opposite sides of the center of the shaft, and each having bolt holes $b^4$. The two parts of the hub are connected together by bolts $b^9$ (shown in Fig. 3) passing through the bolt holes $b^5, b^6$, and $b^7$. The bolt hole $b^5$ is in a lug $b^2$, and the bolt hole $b^6$ is countersunk in the eccentric $b'$, as shown in Fig. 4. Since the fixed hub B is not parted on the center line of the bore, it becomes necessary in order to clamp it readily on the shaft, to cut away the interior of the part $B^2$ near the edges next to the shoulder $b^8$. The shaft may be turned down so as to fit the said shoulder and then the hub clamped on, or the hub may be keyed on the shaft in the ordinary way.

C represents a casting preferably made in two separable parts connected together by lugs $c^3$ and bolts $c^4$. The front portion C' constitutes a hood adapted to engage the eccentric $b'$ which revolves in contact with the interior surface $c'$ of said hood; the hood being held against longitudinal motion on the eccentric by means of the ring $c^2$ which is screwed or otherwise attached to the hood, and has an overhanging lip as shown in Fig. 5. The plate $C^3$ which serves to stiffen the back of the hood and also to limit the longitudinal motion of the eccentric therein, is perforated as shown at $C^6$ so as to allow the hood to have a play about the shaft A. To the back of this hood and preferably made integral therewith, is the shifting eccentric $C^2$ which is in the form of a hollow ring set eccentric to and inclosing the shaft. The hood C' is provided with perforated lugs $c$.

G represents the fly wheel for operating the governor, and it should preferably be a separate wheel from the belt wheel of the engine. This fly wheel consists of two portions bolted together at $g'$ and provided with bosses $g$, perforated as shown. The spokes $G^2$ of this wheel terminate in a sleeve $G'$ free to revolve on the cylindrical portion $b$ of the hub B.

The weighted arms H are pivoted at one end to the bosses $g$ of the fly wheel, and are provided near their other ends with sliding weights H' adjusted to the desired position on the said arms by clamp screws $h$, and provided on their sides next the periphery of the fly wheel with screws $h'$ which may be set projecting such a distance from the weights H as to limit their throw outward, due to the said screws striking the interior of the periphery of the fly wheel. In this manner the maximum amount the engine is to be throttled down may be readily regulated. Centripetal springs P are connected to the said arms as shown and the tension of said springs is adjusted by screwing up on the bolts $p$ whose ends engage in nuts $p'$ attached to the said springs P. These weighted arms H are connected to the oppositely disposed lugs $B^4$ by links K; and to the arm $B^3$ the bell crank lever M is pivoted. One end of this bell crank lever is connected by the link N to one of the lugs $c$ on the hood C'; and the other end of the bell crank lever M is connected by the strap N' to the fly wheel. It will be obvious that, as the shaft revolves, the centrifugal motion will tend to throw the weights H' outward, and arms H being bound to the hub B and the shaft A by the straps or links K will push the fly wheel backward in the opposite direction. The fly wheel will pull on the link N' pushing on the link N and moving the shifting eccentric, all as indicated in dotted lines in Fig. 1. In this figure the position of the center of the shaft being indicated by $s$ and the center of the fixed eccentric by $e$, the center of the shifting eccentric is moved from $e'$, the position of its center when the parts are in the position indicated by the full lines to $e^2$, which represents the center of the shifting eccentric when the parts are in the position indicated by the dotted lines; and the point of cut off is correspondingly varied. In slowing down the reverse action takes place.

The benefit gained by the interposition of the bell crank lever M, pivoted to the fixed hub, between the shifting eccentric and the fly wheel is as follows:—If the engine runs in the direction of the arrow Q, and if the load be thrown off, the engine would run ahead of the governor, the arms would fly out turning the fly wheel backward relative to the shaft, and moving the shifting eccentric so as to throttle down on the engine. This action is practically a weighing of the load. Since the bolt hole $b^3$ of the arm $B^3$ lies in the prolongation of the line through the center of the shaft and of the eccentric $b'$; it will be obvious that, the relative position of the fixed and shifting eccentrics may be readily changed, as by connecting the link N and bell crank lever M to the other one of the two lugs $c$, and connecting arms H to the other lug $g$ thus reversing the governor for the engine to run in the opposite direction.

In the modified form of the device shown in Figs. 6 and 7 the hub $G^3$ of the fly wheel G is keyed on the shaft A, and the fixed eccentric E is rigidly attached to the said hub. The shifting eccentric E' is attached to the hood $E^2$ which engages the fixed eccentric E and is held thereon by a ring $c^2$. The curved arm $H^2$ is pivoted at $h^0$ to the hub and carries the sliding weight $K^3$, the other end of said arm is connected by the link $k^2$ to the lug $c$ attached to the hood $E^2$. As the arm $H^2$ is thrown out by centrifugal force, from the closed to the most open position, the center of the shifting eccentric E' is moved from $e$ to $e'$ and the cut off is varied accordingly.

Having thus described my invention, what I claim, and desire to secure by Letters Patent of the United States, is—

1. In a speed governor of the character described, the combination with a shaft and a hub rigidly attached thereto, of a fixed eccentric rigidly attached to said hub, a fly wheel journaled on said hub, weighted arms connecting said fly wheel and said hub, a hood revolubly mounted on said fixed eccentric, a hollow ring rigidly attached to said hood eccentrically thereto, mechanism connecting said hollow ring and the valve, and a lever pivoted to said hub and connecting said hollow ring and said hood to the fly wheel, substantially as and for the purposes described.

2. In a speed governor of the character described, the combination with a shaft and a hub rigidly attached thereto, the said hub having lugs projecting therefrom; of a fixed eccentric integral with or rigidly attached to the end of said hub opposite to said lugs; a fly wheel journaled on said hub between said lugs and said eccentric; weighted arms connected to said lugs and to said fly wheel; a shifting eccentric revolubly connected to said fixed eccentric; a bell crank lever and straps connecting said shifting eccentric to the fly wheel; and mechanism connecting said shifting eccentric with the valve, substantially as and for the purposes described.

3. In a speed governor of the character described, the combination with a shaft and a hub rigidly attached thereto, the said hub having lugs projecting therefrom; of a fixed eccentric integral with or rigidly attached to the end of said hub opposite to said lugs; a fly wheel journaled on said hub between said lugs and said eccentric; weighted arms connected to said lugs and said fly wheel; a hood revolubly mounted over said fixed eccentric and perforated as shown, a hollow shifting eccentric integral with or rigidly attached to the back of said hood, a bell crank lever and straps connecting said shifting eccentric with the fly wheel, and mechanism connecting said shifting eccentric with the valve, substantially as and for the purposes described.

4. In a speed governor of the character described, the combination with a shaft and a hub rigidly attached thereto, the said hub having lugs projecting therefrom; of a fixed eccentric integral with or rigidly attached to the end of said hub opposite to said lugs; a fly wheel journaled on said hub between said lugs and said eccentric; weighted arms connected to said lugs and to said fly wheel; a cup-shaped cylindrical hood with bottom plate perforated as shown revolubly mounted over said fixed eccentric, a ring with overhanging lip secured to the face of said hood, a hollow shifting eccentric integral with or rigidly attached to the back of said hood, a bell crank lever and straps connecting said shifting eccentric with the fly wheel, and mechanism connecting said shifting eccentric with the valve, substantially as and for the purposes described.

In testimony whereof I affix my signature in presence of two witnesses.

WILLIAM H. VON MENGERINGHAUSEN.

Witnesses:
 WM. H. OTTEMILLER,
 J. D. PORTER.